(No Model.)
A. J. PERRY.
NUT LOCK.
No. 406,953. Patented July 16, 1889.
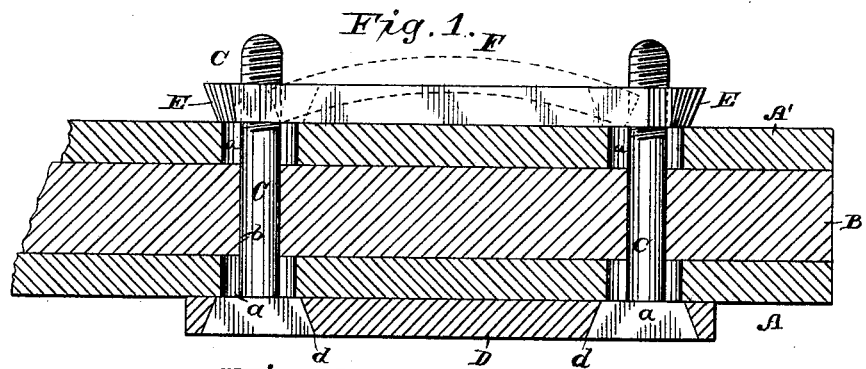
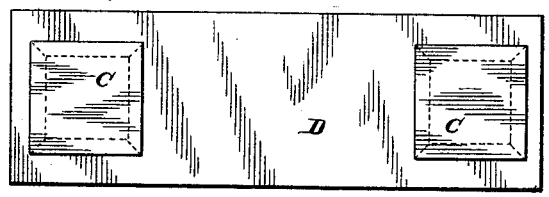
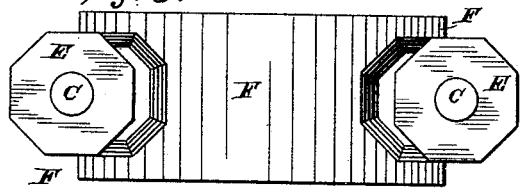
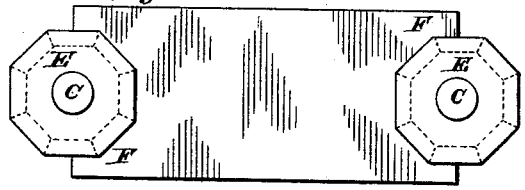
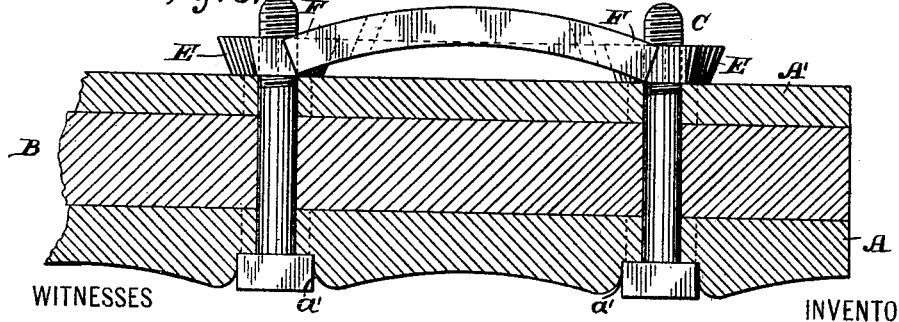
WITNESSES
E. A. Newman,
C. M. Newman,
INVENTOR
Alexander J. Perry
By his Attorneys
Baldwin Hopkins & Peyton

UNITED STATES PATENT OFFICE.

ALEXANDER J. PERRY, OF THE UNITED STATES ARMY.

NUT-LOCK.

SPECIFICATION forming part of Letters Patent No. 406,953, dated July 16, 1889.

Application filed March 23, 1887. Serial No. 232,154. (No model.)

*To all whom it may concern:*

Be it known that I, ALEXANDER J. PERRY, of the United States Army, now residing at San Francisco, San Francisco county, California, have invented certain new and useful Improvements in Bolt and Nut Locks, of which the following is a specification.

My improvements are especially designed for use in connection with fish-plates for uniting the abutting ends of railway-rails; but my invention is not thus limited in its application, as some features of the invention may be employed wherever it is necessary or desirable to lock a bolt in its socket or lock a nut to its bolt.

In the accompanying drawings, illustrating my invention, Figure 1 shows a section of a railway-rail and fish-plates with my improvements applied. Fig. 2 is a view of the bolt-locking plate. Figs. 3 and 4 are views of the nut-locking plate and nuts, and Fig. 5 illustrates a modified construction for locking the bolts.

In Fig. 1 of the drawings I have shown my improvements applied to one end of the fish-plates on one side of the rail-joint. The locking devices on the opposite side of the joint may be precisely the same, and need not be illustrated or described.

The fish-plates A A' on opposite sides of the rail B are preferably provided with elongated apertures $a$, somewhat longer than the width of the bolts C, to admit of the bolts having a slight movement with the rail without moving the fish-plates. Such a movement is often caused by the longitudinal expansion and contraction of the rail, and it is desirable that the fish-plate remain stationary while admitting the movement of the bolts with the rail. The bolts C, which extend through the apertures $a$ and through the apertures $b$ in the rail, are locked in position by a plate D, provided with apertures or sockets $d$, through which the shanks of the bolts are inserted, and thus forming closed recesses or sockets, in which the squared or polygonal heads of the bolt neatly fit. The sockets $d$ are preferably beveled to correspond with the beveled heads of the bolts, so that when the bolts are driven home and the bolt-heads seated in their sockets the plate is held in place without additional fastenings and will effectively prevent the bolts from turning. Instead of using a separate locking-plate, the fish-plate may, in addition to the aperture $a$, have a socket $a'$ for the head of the bolt, as indicated in Fig. 5.

The polygonal nuts E have beveled sides tapering from their upper or outer ends inwardly. When driven home on the bolts, the flat under sides of the nuts (which are the smaller sides) rest against the fish-plate A'. The fish-plates are firmly secured to the rail by the two bolts C and their nuts, and the bolts are prevented from turning in their sockets by means of the locking-plate D, or by the sockets in the fish-plates, as indicated in Fig. 5. It now remains to lock the nuts to the bolts to prevent them from turning thereon. This I effect by means of a semi-rigid endwise-expansible bar or plate F, having forked beveled ends to fit the beveled nuts.

The bar, when straight or extended to its greatest extent, is of a length sufficient to extend from one bolt to the other and inclose the nuts in its forked ends. The forked ends of the plate F, or rather the recesses in the ends of the plate, are preferably of a form or contour to correspond with one-half of the nut, and the sides of the recess are beveled to correspond with the bevels on the nuts. It is not, however, absolutely necessary that the recesses correspond exactly with the shape of the nuts, as the tines of the forks embracing opposite sides of the nuts will be effective, but not so much so as where the recesses accurately fit one-half of the nut, as indicated in the drawings. It is, however, always desirable to have the tines of the forks beveled to correspond with the beveled sides of the nuts. Before being put in place the locking-plate F is bent, as shown in Fig. 1, so that the extreme ends of the fork on each end of the plate may be inserted under the nuts. When in this position the plate is forced in and straightened out by means of a sledge-hammer or the like. The locking-plate now lies parallel with the fish-plate, and its forked ends embrace the beveled nuts. The plate cannot disengage itself from the nuts, and the nuts cannot turn on the bolts. To unlock the nuts the plate F may be bent and thus removed by applying a tool between the locking-plate and the fish-plate.

The locking-plate F may be made of steel, iron, or any other suitable material, but preferably of wrought-iron.

I claim as my invention—

1. The combination, substantially as herein set forth, of the bolts, their beveled nuts, and the semi-rigid endwise-expansible locking-plate or bar forked at opposite ends and having beveled tines which correspond with and snugly fit the beveled nuts when the locking-plate is expanded to its greatest extent.

2. The combination, substantially as herein set forth, of the abutting rails, the fish-plates having elongated apertures for the bolts and overlapping the abutting ends of the rails, the bolts having angular beveled heads, and the bolt-locking plate having angular beveled recesses closed on all sides for the bolt-heads.

In testimony whereof I have hereunto subscribed my name.

ALEX. J. PERRY.

Witnesses:
D. A. THATCHER,
F. C. FORD.